July 30, 1963 W. SHOCKLEY 3,099,591

SEMICONDUCTIVE DEVICE

Filed Dec. 15, 1958 2 Sheets-Sheet 1

WILLIAM SHOCKLEY
INVENTOR.

BY Flehr and Swain

ATTORNEYS

July 30, 1963 W. SHOCKLEY 3,099,591

SEMICONDUCTIVE DEVICE

Filed Dec. 15, 1958 2 Sheets-Sheet 2

WILLIAM SHOCKLEY
INVENTOR.

BY Flehr and Swain

ATTORNEYS

United States Patent Office 3,099,591
Patented July 30, 1963

3,099,591
SEMICONDUCTIVE DEVICE

William Shockley, 23466 Corta Via, Los Altos, Calif.

Filed Dec. 15, 1958, Ser. No. 780,327
8 Claims. (Cl. 148—33)

This invention relates to a semiconductive device and more particularly to a junction semiconductive device.

In copending application Serial No. 637,244, filed January 30, 1957, now abandoned, of which this is a continuation-in-part, there is described a semiconductive device and method of making the same which has a relatively thin center region which plays a predominant role in establishing the characteristics of the device and a relatively thick outer region having low concentration gradients at the junction to minimize the effect of surface conditions on the operation of the device.

In copending application Serial No. 722,577, filed March 19, 1958, now abandoned, of which this is also a continuation-in-part, there is described a semiconductive device which has a central region in which carrier multiplication through avalanche breakdown occurs initially and an outer surrounding region which is exposed to the surface and which includes low concentration gradient junctions at the surface whereby the avalanche characteristics are not affected by surface conditions. In the device of said copending application, the outer region serves to establish the holding characteristics of the device.

As is well known, semiconductive devices are subject to an effect which is often referred to as channelling. That is, paths which are depleted of carriers exist adjacent to the surface of the device. It is believed that the channelling is due to surface charges carried on the outside surfaces of the device, for example, on the oxide coatings formed on the device or on the dirt, grit, moisture or the like formed on the surface. When these charges have the sign of majority carriers inside the semiconductor, they repel like charges within the device and attract minority carriers thereby creating channels in the device adjacent the surface. The minority carriers flow through this channel effectively bypassing the layer, therefore not entering into the operation of the device.

It is a general object of the present invention to provide a semiconductive device in which channelling is minimized.

It is another object of the present invention to provide a semiconductive device in which the channelling effect is minimized and in which the junctions have relatively high voltage breakdown at the surface.

It is a further object of the present invention to provide a semiconductive device in which low concentration gradient junctions are formed at the surface whereby they have high voltage breakdown characteristics, and in which a portion of the surface layers include an insert or region which has a relatively high impurity concentration thereby minimizing channelling.

In order to minimize surface channel effects, it is advantageous to have highly doped regions extending to the surface of the device. However, with such regions extending to the surface, the junctions formed will have a high concentration gradient and relatively low breakdown voltage characteristics. Further, the junctions would be susceptible to external conditions. Thus, the two effects work against one another. To prevent surface channelling, one requires high impurity concentration at the surface, while to increase the voltage breakdown and make the device immune to external conditions, a relatively low concentration gradient junction is required at the surface.

It is a further object of the present invention to provide a device in which a low concentration gradient junction is formed at the surface and in which at least one of the layers extending to the surface includes a relatively high impurity concentration insert or region which minimizes surface channelling through the layer containing the same.

These and other objects of the present invention will become more apparent from the following description when taken in conjunction with the accompanying drawings.

Referring to the drawing:

FIGURES 1A–C show a device in accordance with the present invention and the steps which may be followed in constructing the same;

Figure 5:
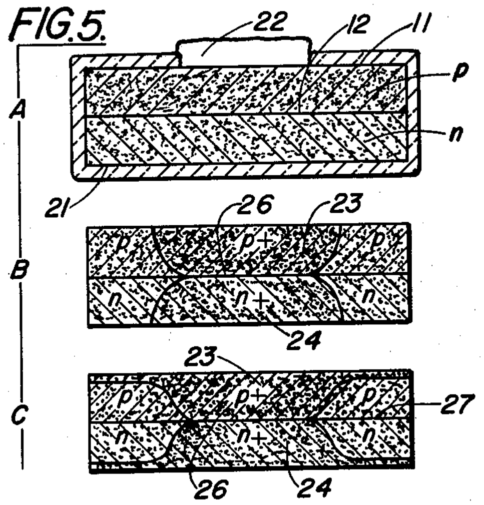
Figure 6:
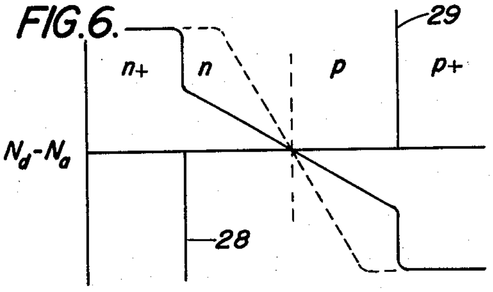
Figure 7:
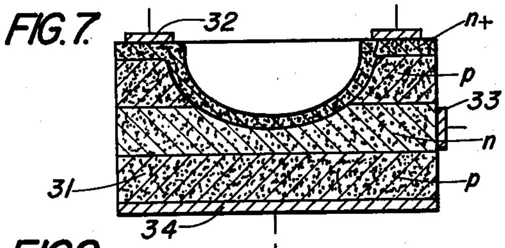
Figure 8:
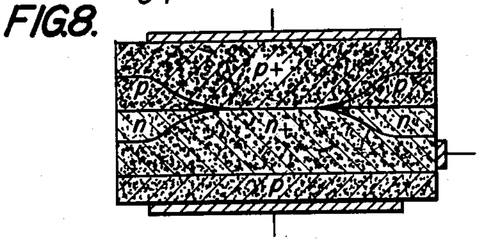

FIGURES 5A–C show another method of constructing a device incorporating the present invention;

FIGURE 6 is a plot of the density of donors and acceptors near the center surface and at the center of the device of FIGURE 5 to show the concentration gradients at the junction;

FIGURE 7 shows a transistor incorporating the present invention;

FIGURE 8 shows another transistor incorporating the present invention; and

FIGURES 9A–E show a method of forming a four-layer switching device which incorporates the present invention.

Briefly, the present invention relates to a semiconductive device which has two or more layers forming one or more junctions. The device includes a center region in which carrier multiplication through avalanche occurs initially, and an outer region which surrounds the inner region and which has a low concentration gradient junction in the region where it intersects the surface. At least one of the layers includes a region which has a higher carrier concentration than the region forming the junction and spaced from the junction where it intersects the surface whereby channelling is minimized.

Figure 1:
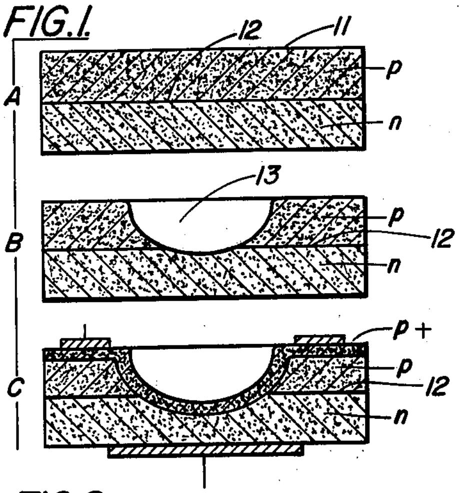

Referring to FIGURE 1, there is schematically illustrated a method of forming a device which incorporates the present invention. A wafer of semiconductive material which has p-type and n-type layers forming a junction 12, FIGURE 1A, is suitably masked by a photoresist coating or by a wax evaporation technique, or any other suitable technique in which certain portions of the surface of the wafer 11 are protected. The wafer is subjected to an etching bath whereby a dimple 13 is formed, which dimple extends down into the device past the junction 12.

The device is then suitably masked and subjected to a diffusion operation wherein boron is pre-diffused on the surface and then diffused into the surface to form a p-type layer which is of higher impurity concentration than the original p-type layer. As is seen, the layer is identified by the letter p+ and the layer extends downwardly and forms a junction with the n-type material at the center of the device and forms a layer contiguous with and of higher concentration with the original p-type layer.

Figure 4:
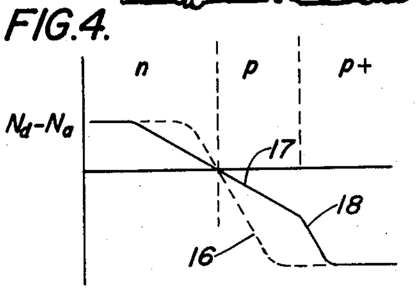
FIGURE 4 is a plot of the density of donors and acceptors near the surface and at the center of the device of FIGURE 1 to show the concentration gradient at the junction for these two regions.

The center region has a high concentration gradient center junction of the type shown by the dotted line 16 in FIGURE 4. As previously described, high concentration gradients at the center junction will cause current multiplication due to avalanche sooner at the center region than at the outer surrounding region. The exposed junction 12 is a low concentration gradient junction as indicated by the solid line 17 in FIGURE 4. The concentration curve line 17 shows that the p+ type layer causes a change of concentration indicated generally by the portion 18 of the curve in the p-type region.

Figure 3:
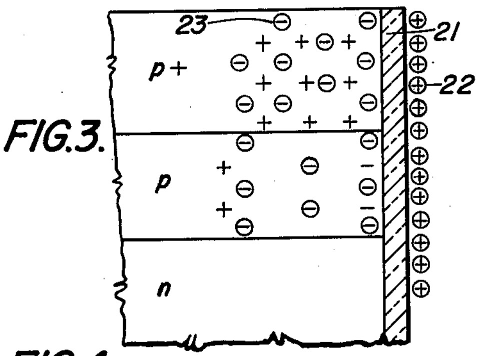
FIGURE 3 is an enlarged view of the edge portion of the device of FIGURES 1 and 2 illustrating schematically the channelling effect.

Referring to FIGURE 3, the edge portions of the device of FIGURE 1 are shown enlarged. The skin 21 represents an oxide film formed on the device, but as previously described it may be dirt, dust, or moisture, or the like, forming a film on the surface. It is believed that films of this sort carry a charge of the same sign as the majority carriers. If the surface charge is large enough, it repels like carriers until an unneutralized layer of acceptors or doners is formed. For example, if the surface charge is positive and on p-type material, it repels majority carriers, +, FIGURE 3, until a layer of unneutralized acceptors, —, FIGURE 3, is formed within the semiconductive body. If the charge is large enough or the material weakly doped, minority carriers, —, FIGURE 3, will be drawn toward the surface to form a channel. If the material is heavily doped, the surface charge can only produce a diminution of majority carriers. A channel will not be formed, or the effects of channelling will be minimized. Preferably, the thickness of the p-type region is such that the space charge layer will not extend into the high concentration p+ region prior to the time that carrier multiplication due to avalanche in the center region occurs.

Thus, in recapitulation, it is seen that a device is formed in which the center region controls the carrier multiplication due to avalanche and that the multiplication occurs initially in this region. The outer region includes a low gradient junction as shown by the line 17, FIGURE 4, which therefore has a relatively high voltage breakdown characteristic at the surface. The device has a relatively weak channel in the p+ portion of the p-type region whereby the channelling is minimized between the junction and any metal electrodes.

Referring to FIGURE 5, another method of constructing a device in accordance with the invention is illustrated. The wafer 11 which includes the p-type and n-type layers forming the junction 12 is exposed to an atmosphere of oxygen whereby an oxide coating 21 is formed on the surface. The oxide coating is removed from a pre-selected region, as for example, by applying wax to the oxide coating over the remainder of the area or protecting the same by photoresist or other acid resisting material. The wafer is then placed in an etchant which serves to etch away the oxide coating in the small predetermined region and expose the underlying p-type layer. Boron 22 is pre-diffused in this opening. The wafer is then subjected to a diffusion operation whereby the boron forms a p+ or high concentration insert of the type shown at 23, FIGURE 5B.

The wafer is then cleaned and again masked and a similar diffusion operation may be employed to form an n+ type insert 24 in the n-type layer whereby a high concentration gradient junction 26 is formed at the center of the device. Subsequent diffusion operations serve to form a p+ layer contiguous with the insert 23 and extending over the adjacent p-type layer to form a p+ layer which extends to the edge of the device. Diffusion of n-type impurities forms an n+ layer extending to the surface and contiguous with the insert 24.

A device is formed which includes a high concentration gradient junction 26 in the center region which causes carrier multiplication by avalanche, and an outer region in which the junction 27 is a low gradient junction and which is, therefore, relatively immune to breakdown. The p+ and n+ portions extending to the surface prevent channelling as previously described.

FIGURE 6 shows a plot of donor and acceptor concentration at the junction. The solid line indicates the impurity concentration in the outer region, while the dotted line indicates the impurity concentration in the central region. From this graph, it is observed that the center junction is a high gradient junction, while the outer junction is a low gradient junction. It is also observed that the concentration at the edges of the outer region are relatively high. As previously described, the region indicated by the vertical lines 28 and 29 preferably occurs at such a position that the space charge layer never reaches this region before avalanche sets in at the center junction.

Figure 2:
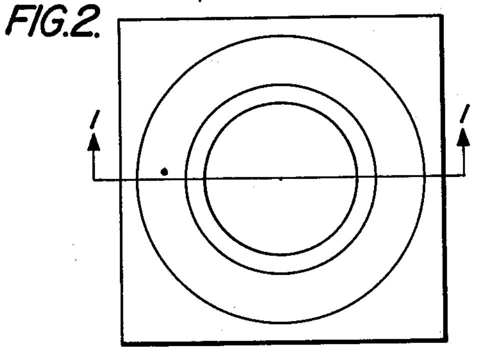
FIGURE 2 is a plan view of the device of FIGURE 1.

Referring to FIGURE 7, a device of the type shown in FIGURES 1 and 2 is subjected to an additional diffusion operation to form a p-type emitter region 31. Thus, the device includes a p+ layer which forms a high concentration gradient junction at the center and which forms a layer or insert at the outer surface. The p-n junction at the surface is a low concentration gradient junction. The emitter junction is a low concentration gradient junction. Suitable ohmic contact may be made to the p+ layer 32 and to the n-type layer 33, and to the lower p layer 34, as indicated. Thus, a transistor is formed in which carrier multiplication through avalanche at the collector junction occurs initially at the center region of the device, and in which channelling is minimized.

A transistor similar to that of FIGURE 7 may be formed from the device of FIGURE 5 by subjecting the device to an additional diffusion in the presence of p-type material to give a p-n-p device or may be subjected to an n-type diffusion to give an n-p-n device. Illustrated in FIGURE 8 is a p-n-p transistor which again has a high concentration gradient collector junction at the center, low concentration gradient collector junction extending to the surface, and a region which minimizes channelling.

Figure 9:
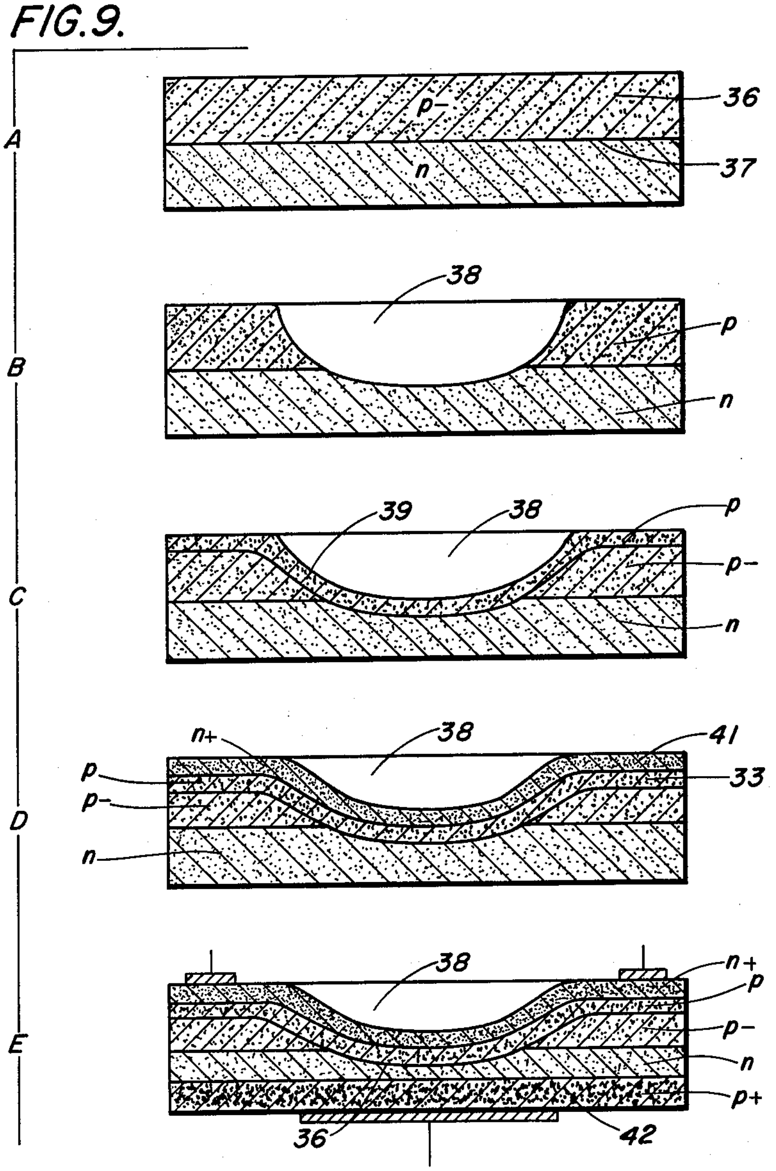

Referring to FIGURE 9, a wafer 36 having p-type and n-type layers forming a junction 37 is illustrated. The wafer is suitably masked and a dimple 38 is formed. The wafer is then subjected to a diffusion operation in which a p-type layer 39 is formed. A subsequent diffusion operation forms an n+ type layer 41 on the surface and a final diffusion operation forms a p+ type layer 42 on the base. Suitable contact may be made to the upper n+ layer and to the lower p+ layer. A two-terminal four-layer switching device is formed in which carrier multiplication through avalanche breakdown occurs initially at the high concentration gradient center junction 36, and in which the center junction at the edges of the device is a relatively low concentration gradient junction. The p-type insert in the upper p-type region serves to minimize channelling.

Thus, it is seen that an improved device is provided. The device includes a high concentration gradient junction at the center in which carrier multiplication through avalanche initially occurs. The junction extending to the surface is a low concentration gradient junction which can withstand relatively high voltages, and the insert of higher impurity concentration spaced from the junction at said surface serves to minimize channelling.

I claim:

1. A semiconductive device including at least first and second layers of opposite conductivity type forming a rectifying junction extending to at least one surface of the device, said device including a first region in which carrier multiplication through avalanche occurs initially and a second region surrounding said first region, one of said layers in said second region having a low concentration of unbalanced charges at the junction and including a region having a high concentration of unbalanced charges spaced from the junction and extending to the surface to reduce channelling through said layer.

2. A semiconductive device including at least first and second layers of opposite conductivity type forming a rectifying junction extending to at least one surface of the device, said device including a first region in which carrier multiplication through avalanche breakdown occurs initially and a second region surrounding said first region, said junction in said second region having a low concentration gradient at said surface, at least one of said layers including a region of high impurity concentration which extends to said surface, said region being spaced from the junction where it intersects the surface a distance which is comparable to the extent of the space charge layer at the junction at the surface when avalanche occurs at the center junction.

3. A semiconductive device including at least first and second layers of opposite conductivity type forming a rectifying junction extending to at least one surface of the device, and a high impurity concentration region spaced from said junction and extending to said surface formed in one of said layers to reduce channelling through said layer.

4. A semiconductive device including at least first and second layers of opposite conductivity type forming a rectifying junction extending to at least one surface of the device and a high impurity concentration region spaced from said junction and extending to said surface formed in one of said layers to reduce channelling through said layer, said region being spaced from said junction at said surface a distance comparable to the extent of the space charge layer during operation.

5. A transistor including collector, base and emitter layers forming collector and emitter junctions, said collector junction extending to at least one surface of the device and having a first region where carrier multiplication through avalanche occurs initially and a second region surrounding the first, at least one of said layers forming the collector junction having a low concentration of unbalanced charges at the junction in the second region and having a high concentration of unbalanced charges spaced from said junction and extending to said surface to reduce channelling through the layer.

6. A transistor including collector, base and emitter layers forming collector and emitter junctions, said collector junction extending to at least one surface of the device and having a first region where carrier multiplication through avalanche occurs initially and a second region surrounding the first, at least one of said layers forming the collector junction having a low concentration of unbalanced charges in the second region and having a high concentration of unbalanced charges spaced from said junction and extending to said surface to reduce channelling through the layer, said high impurity region being spaced from said junction a distance comparable to the extent of the space charge layer at said region of the junction during operation.

7. A semiconductive device including four contiguous layers forming three junctions, said device including an inner region in which carrier multiplication through avalanche breakdown at the center junction occurs initially and a second region surrounding said first region, at least one of said layers forming the center junction having a low concentration of unbalanced charges at the junction in the second region and a high concentration of unbalanced charges spaced from the junction extending to the surface to reduce channelling through the layer.

8. A semiconductive device including four contiguous layers forming three junctions, said device including an inner region in which carrier multiplication through avalanche breakdown at the center junction occurs initially and a second region surrounding said first region, at least one of said layers forming the center junction having a low concentration of unbalanced charges at the junction in the second region and a high concentration of unbalanced charges spaced from the junction extending to the surface to reduce channelling through the layer, said last named region being spaced from said junction a distance comparable to the extent of the space charge layer during operation.

References Cited in the file of this patent

UNITED STATES PATENTS

| | | |
|---|---|---|
| 2,770,761 | Pfann | Nov. 13, 1956 |
| 2,813,048 | Pfann | Nov. 12, 1957 |